(12) United States Patent
Prendergast et al.

(10) Patent No.: US 8,238,045 B2
(45) Date of Patent: Aug. 7, 2012

(54) DUAL MOUNT ADAPTER

(75) Inventors: Jonathon R. Prendergast, Newport Beach, CA (US); Ronald R. Soto, Laguna Hills, CA (US)

(73) Assignee: Norotos, Inc., Santa Ana, CA (US)

( * ) Notice: Subject to any disclaimer, the term of this patent is extended or adjusted under 35 U.S.C. 154(b) by 479 days.

(21) Appl. No.: 12/559,406

(22) Filed: Sep. 14, 2009

(65) Prior Publication Data

US 2010/0067126 A1 Mar. 18, 2010

Related U.S. Application Data

(60) Provisional application No. 61/097,197, filed on Sep. 15, 2008.

(51) Int. Cl.
*G02B 7/02* (2006.01)

(52) U.S. Cl. .......... 359/816; 359/827

(58) Field of Classification Search .......... 359/811, 359/812, 815, 816, 827, 480, 481; 2/6.2, 2/422, 424, 426, 428, 438, 439, 442, 443; 362/191; 313/524; 340/981
See application file for complete search history.

(56) References Cited

U.S. PATENT DOCUMENTS

| | | | | |
|---|---|---|---|---|
| 4,449,787 A | * | 5/1984 | Burbo et al. | 313/524 |
| 4,887,189 A | * | 12/1989 | Garrett | 362/23 |
| 5,471,374 A | * | 11/1995 | Palmer | 362/191 |
| 5,542,627 A | | 8/1996 | Crenshaw et al. | |
| 6,457,179 B1 | * | 10/2002 | Prendergast | 2/6.2 |
| 6,820,285 B2 | * | 11/2004 | Bataille et al. | 2/422 |

FOREIGN PATENT DOCUMENTS

| | | |
|---|---|---|
| EP | 0-545-721 | 6/1993 |
| EP | 0 545 721 A1 | 6/1993 |
| EP | 2 063 133 A2 | 5/2009 |
| GB | 2-167-644 | 6/1986 |
| GB | 2 167 644 A | 6/1986 |
| GB | 2-267-764 | 12/1993 |
| GB | 2 267 764 A | 12/1993 |

OTHER PUBLICATIONS

GB Office action dated Jun. 27, 2011 issued to corresponding application No. 0916173.8, (2 pages).
Norotos Inc., "Dual Dovetail Adapter," norotos.com, retrieved from the interne on Oct. 14, 2009, http://www.norotos.com/shop/prodView.asp?idproduct=36.
Search Report under Section 17 dated Oct. 16, 2009, Application No. GB0916173.8.

* cited by examiner

*Primary Examiner* — Loha Ben
(74) *Attorney, Agent, or Firm* — Christie, Parker & Hale, LLP

(57) ABSTRACT

An adapter for night vision goggles includes a body including a first arm and a second arm each configured to receive a night vision goggle mount. A first night vision goggle mount is removably attached to the first arm or the second arm and a base extends from the body for attaching the adapter to night vision goggles.

19 Claims, 11 Drawing Sheets

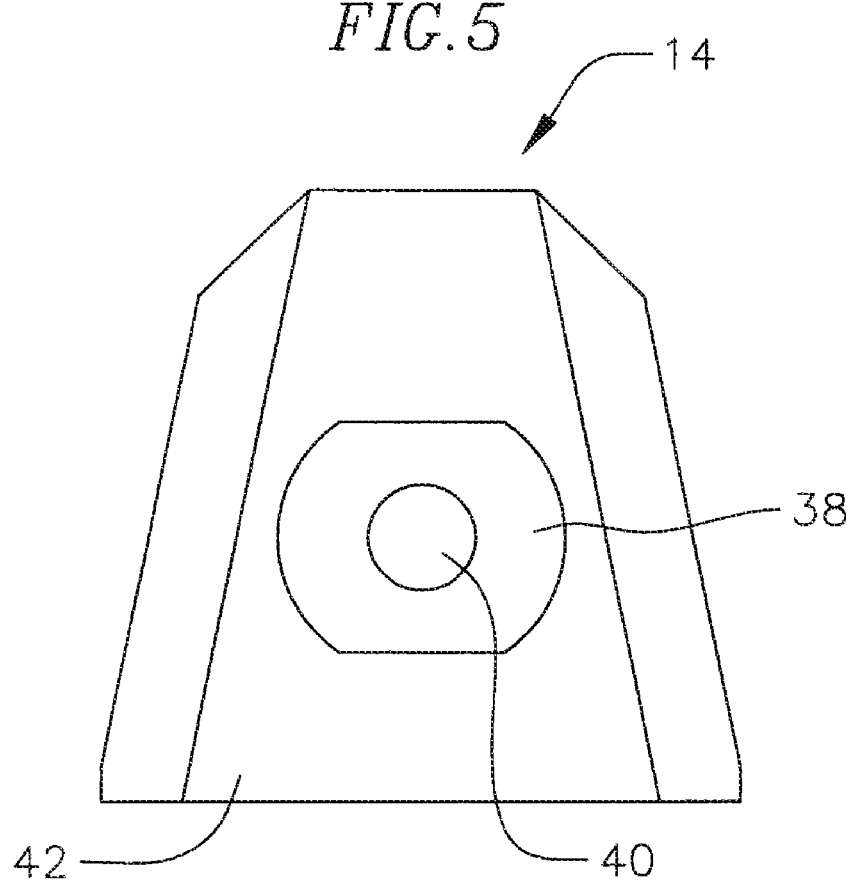
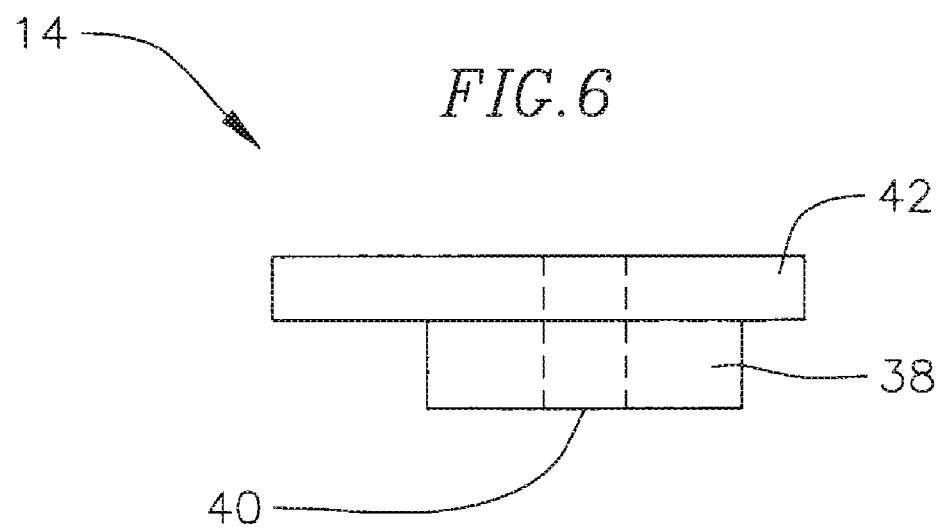

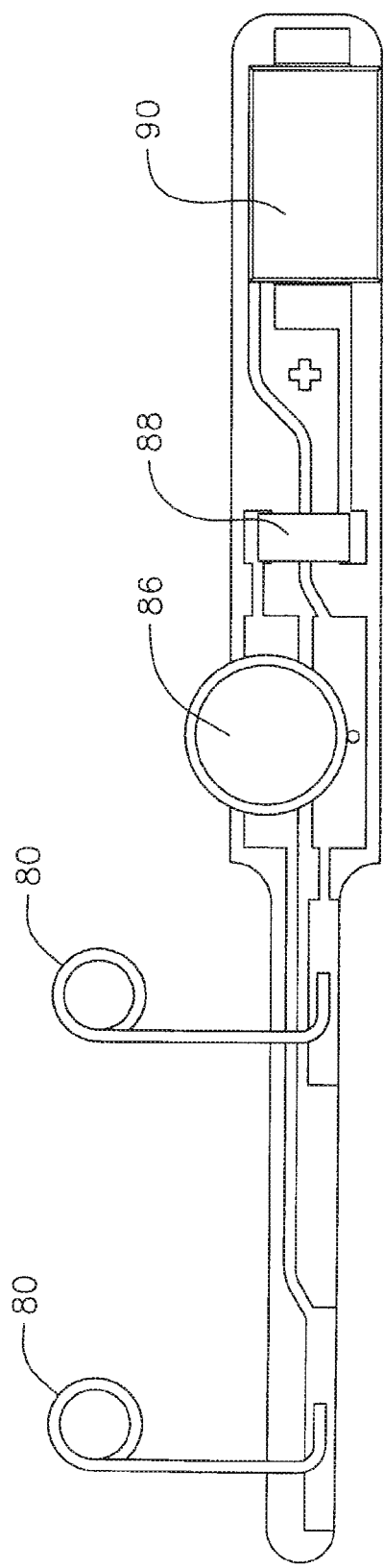
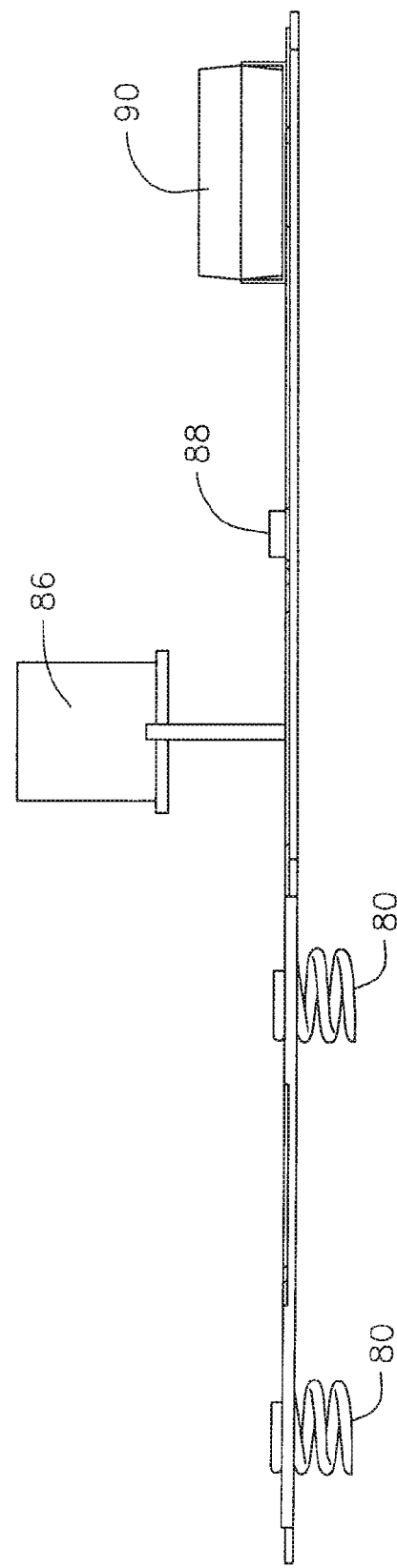

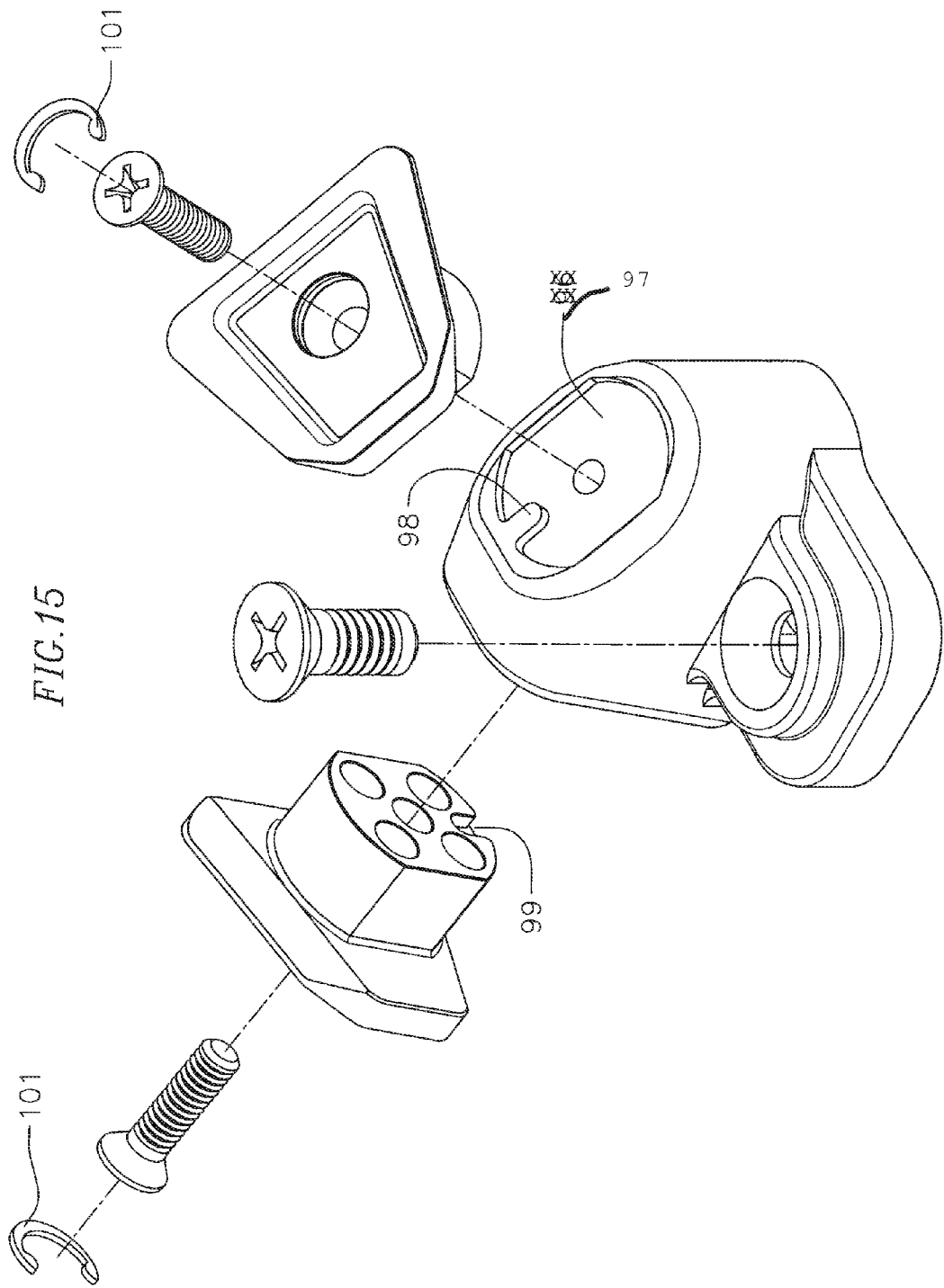

DUAL MOUNT ADAPTER

CROSS-REFERENCE TO RELATED APPLICATION(S)

This application claims priority to and the benefit of U.S. Provisional Application No. 61/097,197, filed in the United States Patent and Trademark Office on Sep. 15, 2008, the entire content of which is incorporated herein by reference.

BACKGROUND OF THE INVENTION

Users of night vision systems often desire a hands-free operation in which binocular or monocular night vision goggles may be mounted to headgear and operated without the need for a user to hold the night vision goggles. Typically, the night vision goggles will be attached to a night vision goggle mount by any one of a variety of mounts, such as a goggle horn mount or a dovetail insert. In the case of monocular night vision goggles, the goggles are aligned with either the user's left or right eye, depending on eye dominance and preference of the user. Since it is not possible to predict with which eye a certain user will prefer to align the goggles, it is desirable to have a night vision goggle system that allows the user to choose an eye preference, and if necessary, switch eye preferences relatively simply in the field. Additionally, not all night vision goggles have the same attachment system, i.e., some may include a "goggle horn" system and some may have a dovetail system. As such, there is a need for an adapter that can accommodate night vision goggles having one of a variety of attachment systems.

SUMMARY

According to an embodiment of the present invention, an adapter for attaching night vision goggles to a goggle mount is provided, the adapter including a body having a first arm and a second arm; a base extending from the body and configured to attach the adapter to night vision goggles; and a first insert removably attached to the first arm or to the second arm for attaching the adapter to the goggle mount, wherein the first arm and the second arm are oriented such that when the night vision goggles are attached to the goggle mount by the adapter, the night vision goggles are substantially aligned with a user's left eye or right eye, respectively.

In one embodiment, the base and the body are integral with each other and the first insert is a dovetail insert, a goggle horn insert or a hot shoe. Further, the first insert may include an engaging member for engaging the goggle mount and a stem extending from the engaging member and adapted to be attached to the first arm or to the second arm. The first arm and the second arm each may have a recessed surface adapted to receive the stem and the recessed surface may have substantially parallel opposing sidewalls that generally correspond to a cross-sectional shape of the stem and prevent relative rotation between the first insert and the body. In one embodiment, the stem comprises a notch and wherein the recessed portion comprises a rib adapted to engage the notch.

The first insert may be attached to the first arm or to the second arm by a fastener, such as a screw, a bolt, or a rivet. Additionally, in one embodiment, the first insert is removably attached to the first arm and a second insert is removably attached to the second arm and the first insert and the second insert may have different configurations. Further, the base may be adapted to be attached to night vision goggles by a fastener, such as a screw, a bolt, or a rivet.

The body of the adapter may have a cavity housing a switch assembly for powering night vision goggles attached to the adapter, wherein the switch assembly is adapted to maintain an electrical connection with attached night vision goggles when the adapter is in a use orientation and wherein the switch assembly is adapted to sever the electrical connection when the adapter is in a stowed orientation. In one embodiment, the switch assembly is adapted to maintain the electrical connection for about 0.5 seconds in the stowed orientation before severing the electrical connection.

In another embodiment of the present invention, an adapter kit for attaching night vision goggles to a goggle mount is provided, the adapter kit including an adapter comprising a body having a first arm and a second arm; and a base extending from the body and configured to attach the adapter to night vision goggles, wherein the first arm and the second arm are oriented such that when the night vision goggles are attached to the goggle mount by the adapter, the night vision goggles are substantially aligned with a user's left eye or right eye, respectively; a plurality of inserts, each of the plurality of inserts removably attachable to the first arm or to the second arm to attach the adapter to a mount; and at least one fastener for removably attaching one of the plurality of inserts to the first arm or the second arm. In one embodiment, the plurality of inserts may include at least one of a dovetail mount, a goggle horn mount or a hot shoe.

BRIEF DESCRIPTION OF THE DRAWINGS

FIG. 5 is a bottom view of a first dovetail insert according to an embodiment of the present invention.

FIG. 6 is a side view of the first dovetail insert of the FIG. 5.

FIGS. 12-14 are an orthogonal, top and side view of an electrical component assembly of a dual mount adapter according to an embodiment of the present invention.

FIG. 15 is an exploded view of yet another embodiment of a dual mount adapter according to the present invention.

DETAILED DESCRIPTION OF THE INVENTION

Figure 11:
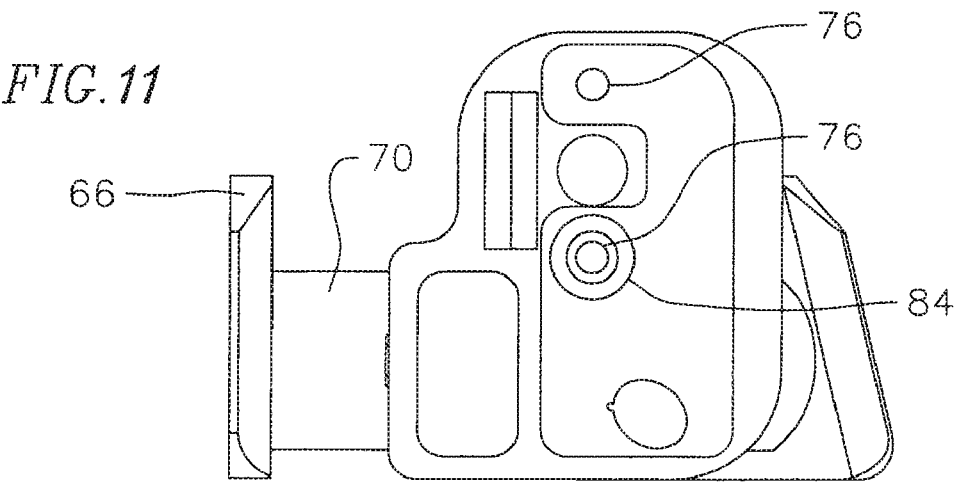
FIG. 11 is a bottom view of the dual mount adapter of FIG. 7.

According to aspects of the present invention, a dual mount adapter is provided for attaching night vision goggles to a night vision goggle headgear mount. Generally, the dual mount adapter is configured to be used with monocular night vision goggles and is configured to locate the night vision goggles in front of either a user's left or right eye, depending on the user's preference. The dual mount adapter also allows a user to relatively easily switch eye preference in the field. In one embodiment, the dual mount adapter is attached to monocular night vision goggles such as described by U.S. Design Pat. No. 413,130, issued Aug. 24, 1999, ("the '130 patent") the entire disclosure of which is incorporated herein by reference. It is noted that embodiments of the dual mount adapter of the present invention will replace the helmet mounting adapter of FIG. 11 of the '130 patent. Additionally, embodiments of the dual mount adapter of the present invention may be used in connection with a headgear mount such shown in U.S. Pat. No. 6,957,449, issued Oct. 25, 2005, U.S. Pat. No. 6,457,179, issued Oct. 1, 2002, or U.S. Publication No. 2007/0012830, filed on Jun. 23, 2006.

The dual mount adapter is designed to be relatively compact yet robust, thereby substantially preventing any "give" or wobble that may either misalign the goggles from the user's eye and/or cause the adapter to fracture on impact. Additionally, the adapter is lightweight so as to minimize its impact and discomfort on a user wearing night vision goggles in the field.

Figure 1:
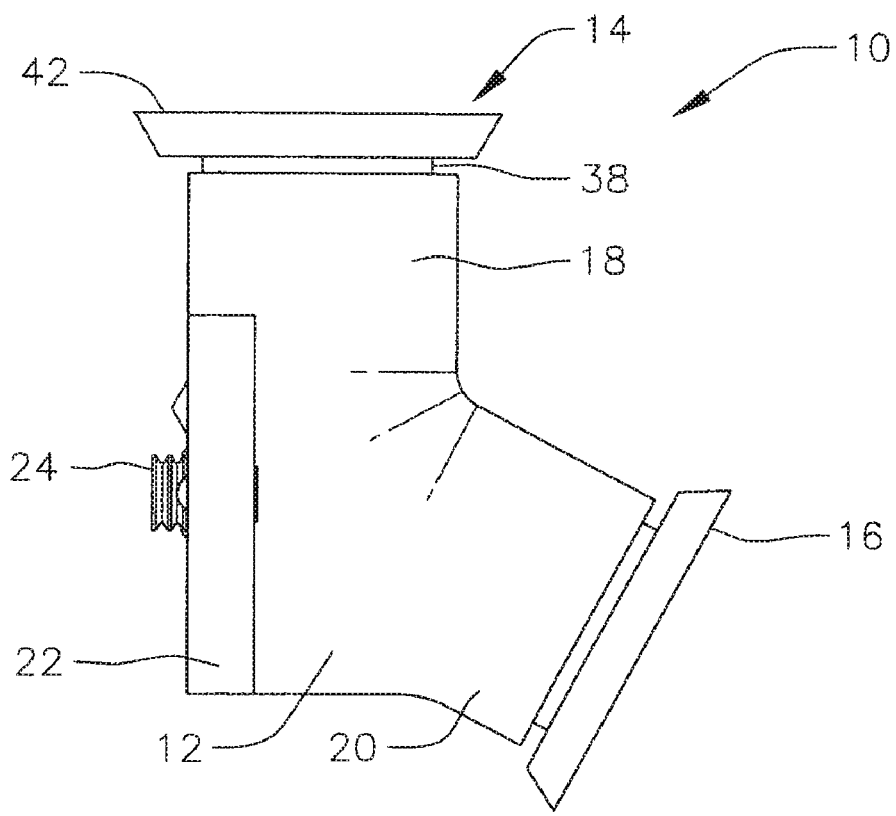
FIG. 1 is a side view of a dual mount adapter according to an embodiment of the present invention.
Figure 2:
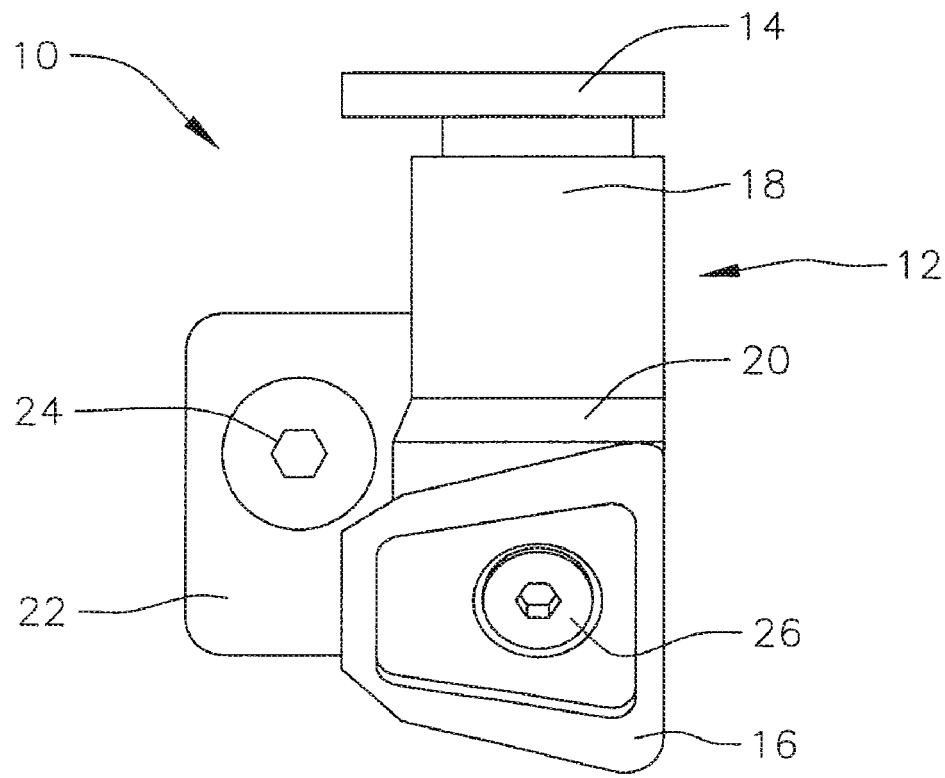
FIG. 2 is a top view of the dual mount adapter of FIG. 1.

With reference now to FIGS. 1 and 2, in one embodiment, a dual mount adapter 10 includes a body 12 having a first arm 18 extending in a first direction, a second arm 20 extending in a second direction, and a base 22 extending from the body and configured to attach the body to night vision goggles. In one embodiment, the body 12 is a single integral component. However, as will be appreciated, and as described with respect to alternate embodiments in more detail below, the dual mount adapter may also be a modular component comprising multiple attached elements.

With continued reference to FIG. 1, the first and second arm 18, 20 are configured to be attached to monocular night vision goggles and to locate monocular night vision goggles attached to the adapter in front of a user's desired eye when the dual mount adapter is mounted to a night vision goggle mount on, for example, a user's headgear. An angle between the first and second arms 18, 20 is such that when either the first or second arm is attached to a night vision goggle mount, the monocular night vision goggles attached to the dual mount adapter 10 are located in front of either a user's left or right eye. In one embodiment, an angle between the first and second arms 18, 20 is between about 110 and about 140 degrees, but it will be appreciated that the present invention is not limited to a specific angle, and that other configurations can be developed depending on the specific night vision goggles used.

Figure 4:
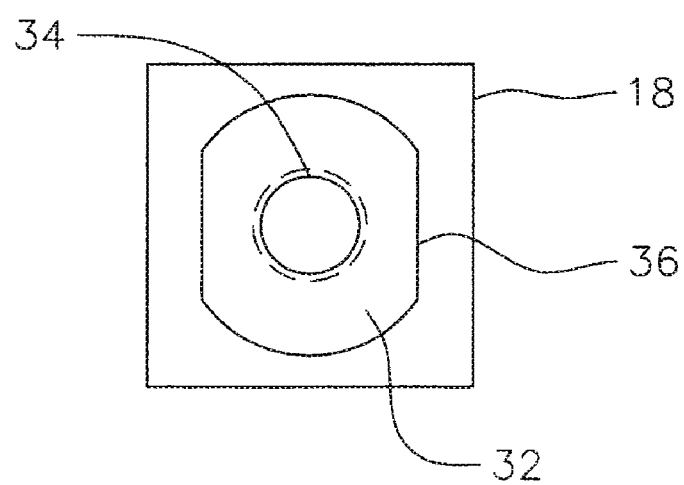
FIG. 4 is a top view of a first arm of the dual mount adapter of FIG. 1 absent a first dovetail insert.

A first dovetail insert 14 is configured to be attached to and protrude from an end of the first arm 18. With reference also to FIGS. 5 and 6, the first dovetail insert 14 includes a dovetail engaging member 42 integral with a stem 38 configured to engage the end of the first arm 18. More specifically, with reference also to FIG. 4, the end of the first arm includes a recess 32 having a cross-sectional shape generally corresponding to a shape of the stem 38. As shown in FIG. 4, the recess 32 may be shaped to include opposing parallel sidewalls 36 that prevent rotation of the first dovetail insert 14 with respect to the body 12 when the stem 38 is inserted into the recess 32. As will be appreciated, other suitable shapes or configurations may be used for the recess 32 and the stem 38 to prevent relative rotation between the first dovetail insert 14 and the body 12.

With continued reference to FIG. 4, the end of the first arm includes a threaded hole 34 adapted to receive a dovetail fastener 26 (FIG. 2). The dovetail fastener 26 can be inserted into a through-hole 40 (FIG. 5) in the first dovetail insert 14 and threaded into the hole 34 to secure the first dovetail insert to the body 12. However, it will be appreciated that the hole 34 does not need to be threaded and that any suitable fastener may be used to attach the first dovetail mount 14 to the first arm 18, including, for example, a rivet, an adhesive, and a weld, among others.

Further, in an alternate embodiment, a second dovetail insert 16 can be attached to an end of the second arm 20. The second dovetail insert 16 is substantially identical to the first dovetail insert 14, and a description of it and its attachment to the body 12 will be omitted. It will be appreciated that since the first dovetail insert 14 is removably attached to the body 12, the dual mount adapter may be used with only a single dovetail insert that can be attached to either the first or second arm 18, 20. Additionally, two dovetail inserts may be used, one each mounted on the first and second arms 18, 20. Further, it will be appreciated that the mounts are not limited to dovetail inserts, but rather may be any suitable connector for attaching night vision goggles to a night vision goggle mount, such as a goggle horn assembly.

Figure 3:
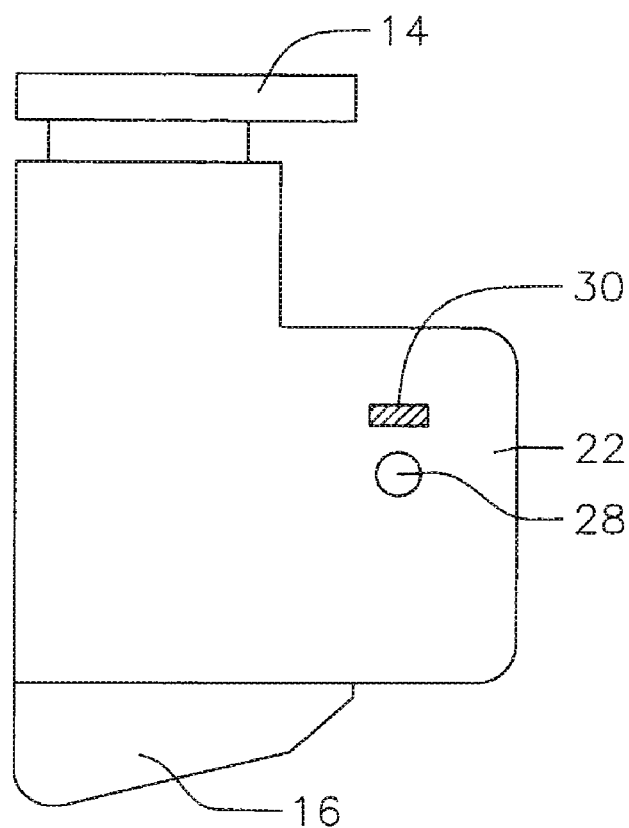
FIG. 3 is a rear view of the dual mount adapter of FIG. 1.

With reference now to FIG. 2, in one embodiment the base 22 for attaching the adapter 10 to night vision goggles is substantially thinner than the body 12 and provides additional surface area to the body 12 for support when the adapter is mounted to night vision goggles. In one embodiment, the base 22 includes a through-hole 28 (FIG. 3) for receiving an adapter fastener 24 to attach the adapter 10 to night vision goggles. The adapter fastener 24 may be, for example, a screw, bolt, pin or another suitable attachment device for securely attaching the adapter 10 to the night vision goggles. It will be appreciated that a variety of suitable removable fasteners may be used to attach the adapter 10 to night vision goggles, not limited to those listed above. Additionally, as shown in FIG. 3, a ridge 30 may be located adjacent the through hole 28 and adapted to engage a groove on the night vision goggles to provide additional resistance against relative rotation between the dual mount adapter 10 and the night vision goggles.

With reference now to FIGS. 7-11, in an alternate embodiment of a dual adapter mount 60 of the present invention, a first dovetail insert 64 is attachable to a body 61 to provide a modular dual adapter mount. Since there are a number of similarities between the modular dual adapter mount 60 and previously described embodiments, only the differences will be described in detail.

The dual adapter mount 60 includes the body 61 having an internal cavity configured to receive a switch assembly 62 as described in more detail below. The body 61 includes a first arm 69 and a second arm 71 each having an angled recessed surface 63 configured to receive a dovetail insert similar to the first and second arms 18, 20 described above. Similarly to previously described embodiments, a base 65 is integral with and extends from the body, the base including a through hole 92 into which a fastener 94 is insertable to attach the dual mount adapter 60 to night vision goggles.

The recessed surfaces 63 of the first and second arms 69, 71 are angled in substantially the same configuration as the first and second arms 18, 20 described above. However, in order to make the overall weight of the body 61 lightweight to minimize its impact on a user when the adapter is attached to headgear but not to night vision goggles, the body incorporates minimal material while still providing sufficient structural integrity and stability to the adapter.

Each recessed surface 63 is generally ovular and has opposing parallel sidewalls 67 for preventing rotation of a dovetail insert inserted into the recess relative to the body 61.

Additionally, each recessed surface 63 may include a pair of opposing ribs 74, 75 extending toward the center of the surface from the edge for receiving corresponding notches 72, 73 on the dovetail engaging member to provide additional resistance against rotation. Additionally, the opposing ribs 74, 75 may be of unequal length or of unique shapes to prevent the dovetail inserts 64 and 66 being inserted incorrectly. In an alternative embodiment, as shown in FIG. 15, a recessed surface 97 may include only a single rib 98 adapted to engage a single notch 99 on a mount to provide additional resistance against rotation and to prevent the mount from being attached incorrectly. Additionally as shown in FIG. 15, retaining rings 101 may be inserted into a fastener recess 102 to prevent the fastener from disengaging from the insert 66 due to vibration.

The first dovetail insert 64 is adapted to be attached to either of the pair of angled recessed surfaces 63 on the body 61. The first dovetail insert 64 includes a dovetail engaging member 68 attachable to a night vision goggle helmet mount and a stem 70 extending from the dovetail engaging member. In one embodiment, the stem 70 is of a length such that when the first dovetail insert 64 is attached to the body 61, night vision goggles attached to the dual mount adapter 60 are aligned with a user's eye. Specifically, a length of the stem may be from about 0.25 to about 3 inches. Since the first dovetail insert 64 can be attached to either of the pair of angled recessed surfaces 63 on the body 61, the first dovetail insert may be configured to contain a significant amount of the overall weight of the dual mount adapter 60, allowing the body 61 to be as lightweight as possible, and minimizing the weight of the adapter when no night vision goggles are attached to it. As noted above, each stem may include a pair of unequal length notches 72, 73 configured to receive a corresponding rib 74, 75 on the recessed surface to prevent relative rotation between the first dovetail insert 64 and the body 61 or, alternatively, each stem may include a single notch 99 configured to receive the single rib 98.

The dual mount adapter 60 is configured to provide electrical power to the night vision goggles during a desired period of time, such as when the goggles are in a use position, and are also configured to remove power from the night vision goggles during a desired period of time, such as when the goggles are in a stowed position. The switch assembly 62 is located within a cavity in the body 61 and supports electrical components for providing power to and removing power from the night vision goggles.

Figure 7:
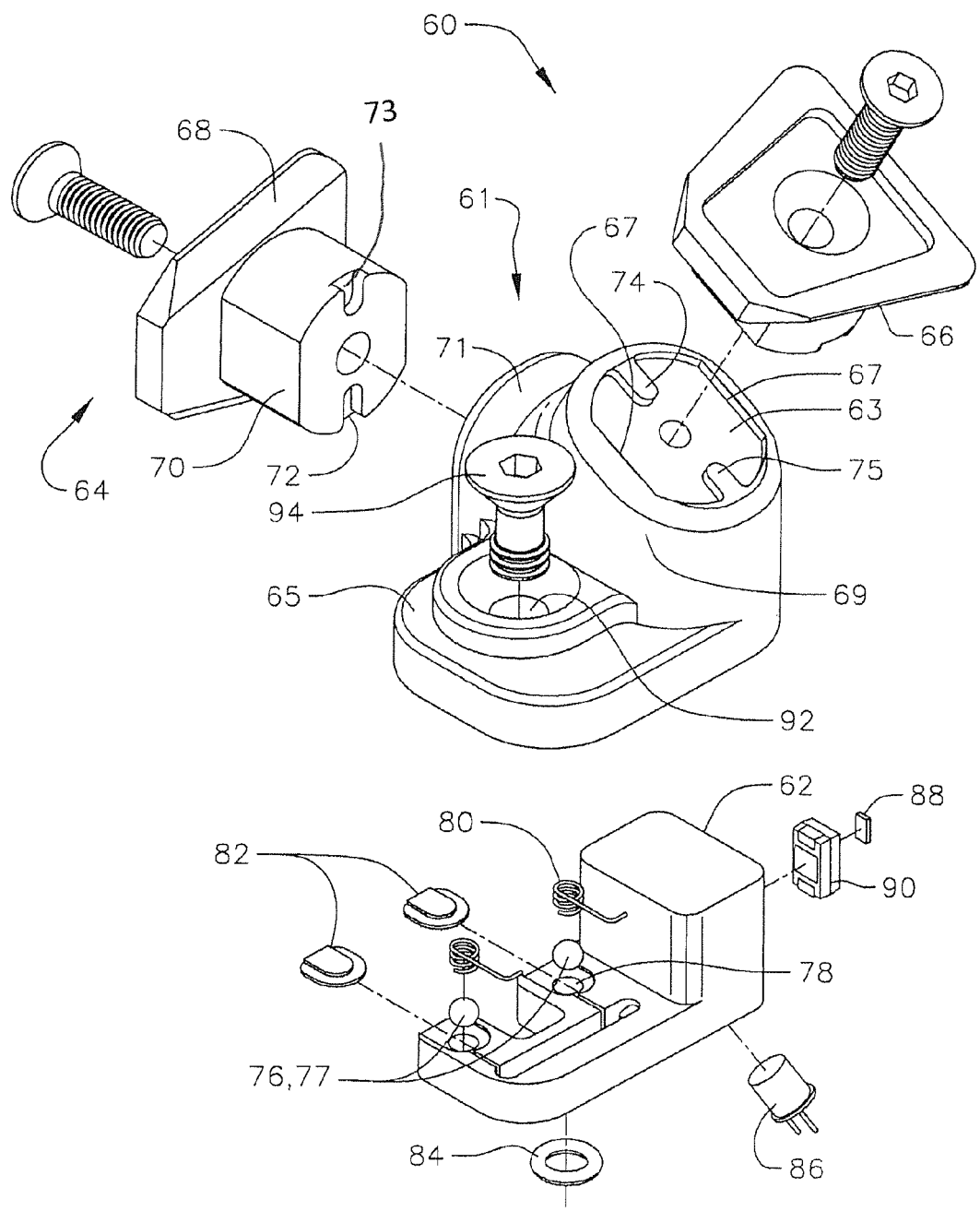
FIG. 7 is an exploded view of an alternate embodiment of a dual mount adapter according to the present invention.
Figure 8:
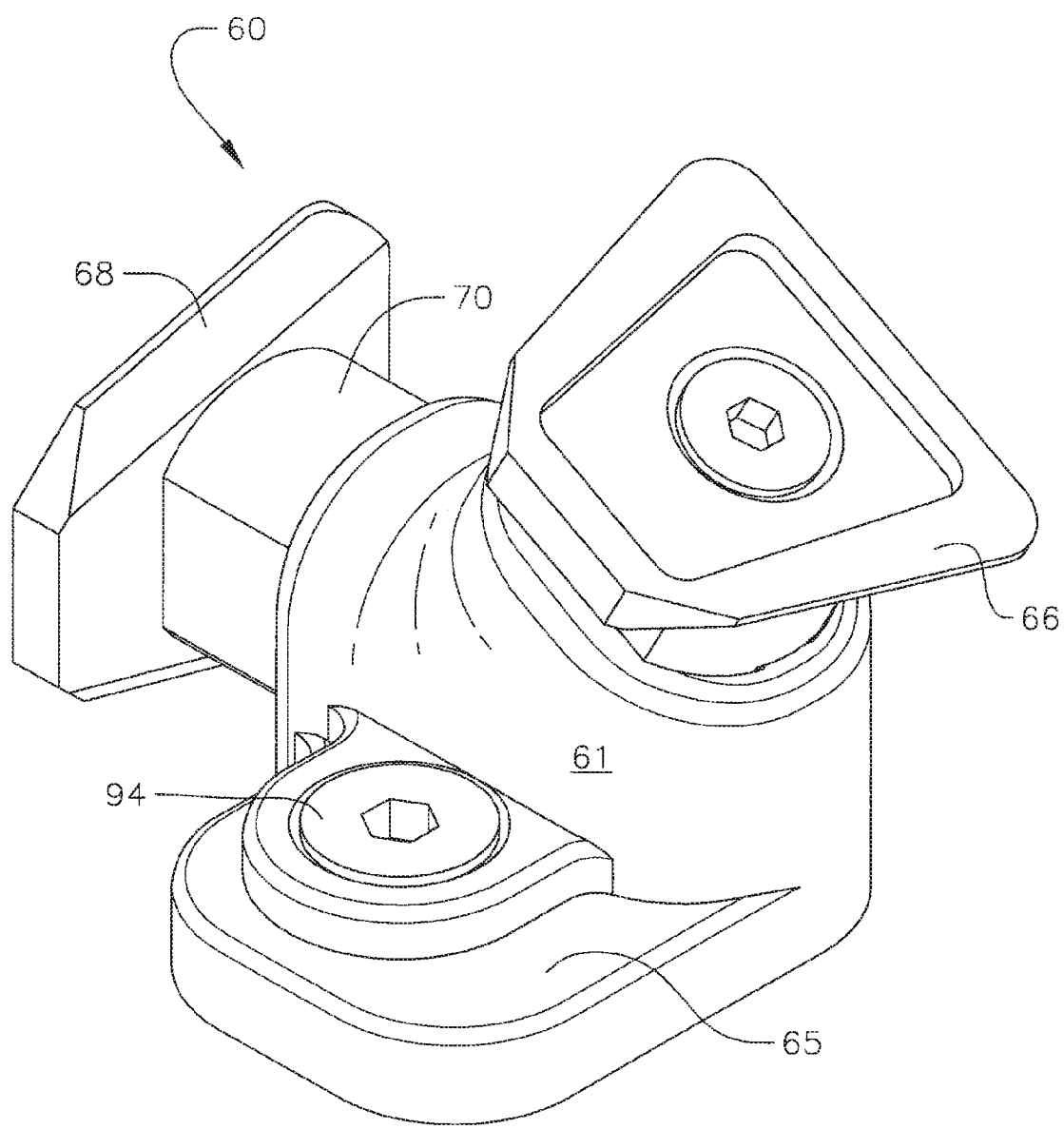
FIG. 8 is an orthogonal view of the dual mount adapter of FIG. 7.
Figure 9:
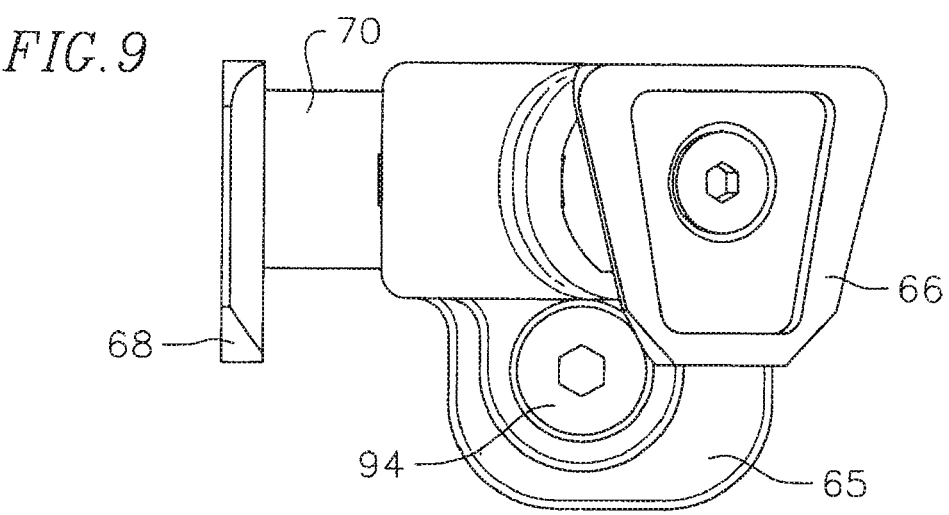
FIG. 9 is a top view of the dual mount adapter of FIG. 7.
Figure 10:
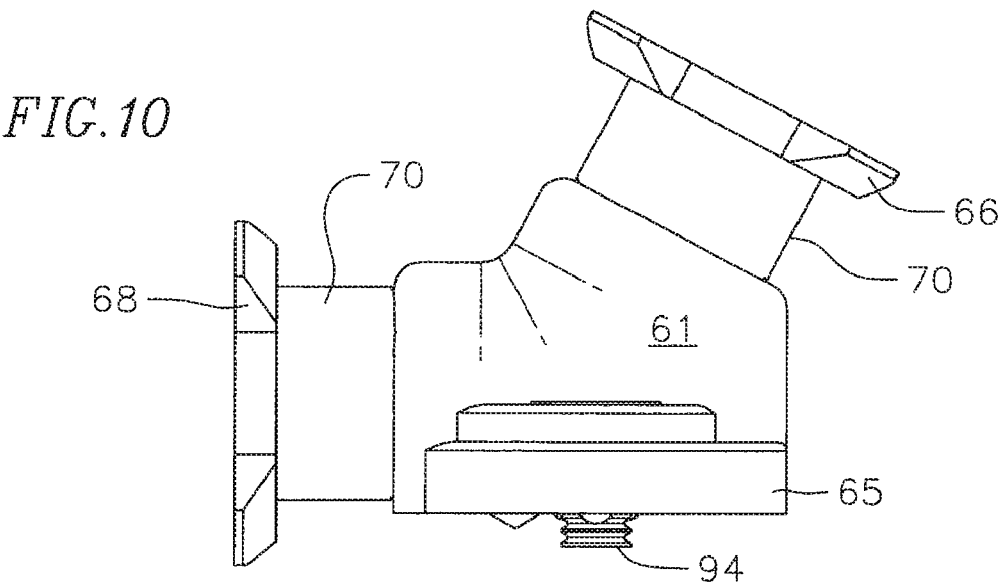
FIG. 10 is a side view of the dual mount adapter of FIG. 7.

With continued reference to FIG. 7, the switch assembly 62 includes a pair of contact balls 76, 77 housed in recesses 78 within the switch assembly. A spring 80 is in contact with each contact ball 76, 77 and a spring cover 82 is located over each spring to maintain contact between the spring and contact ball. A seal 84 electrically isolates a positive contact ball 76 from a negative contact ball 77, preventing a short circuit from occurring especially in wet or underwater conditions. A tip-over switch 86, a resistor 88, and a capacitor 90 are also incorporated to electrically control the power to the night vision goggles, and specifically, to turn the night vision goggles on in the use position and off in a variety of stowed positions.

In one embodiment, the adapter 60 is configured to provide power to night vision goggles when the mount to which the adapter is attached is in a use position and to cut power from the night vision goggles when the mount is moved to a stowed position, thereby preventing any light emitted by the night vision goggles from revealing the location of a user. However, because a user in the field may encounter obstacles that involve, for example, jumping, rolling, spinning, and other such maneuvers that may temporarily put the mount into a "stowed" position, it may be desirable for an electrical connection to be briefly maintained between the adapter and the night vision goggles rather than immediately shutting off so that the goggle remain operational during such maneuvers. Accordingly, a resistor 88 and a capacitor 90 are provided within the switch assembly to provide about half a second of stored power to allow the dual mount adapter 60 to tolerate bouncing or other movement without immediately shutting off. In one embodiment, the resistor 88 and capacitor 90 provide enough stored power for the night vision goggles to remain on continuously during such maneuvers.

Figure 12:
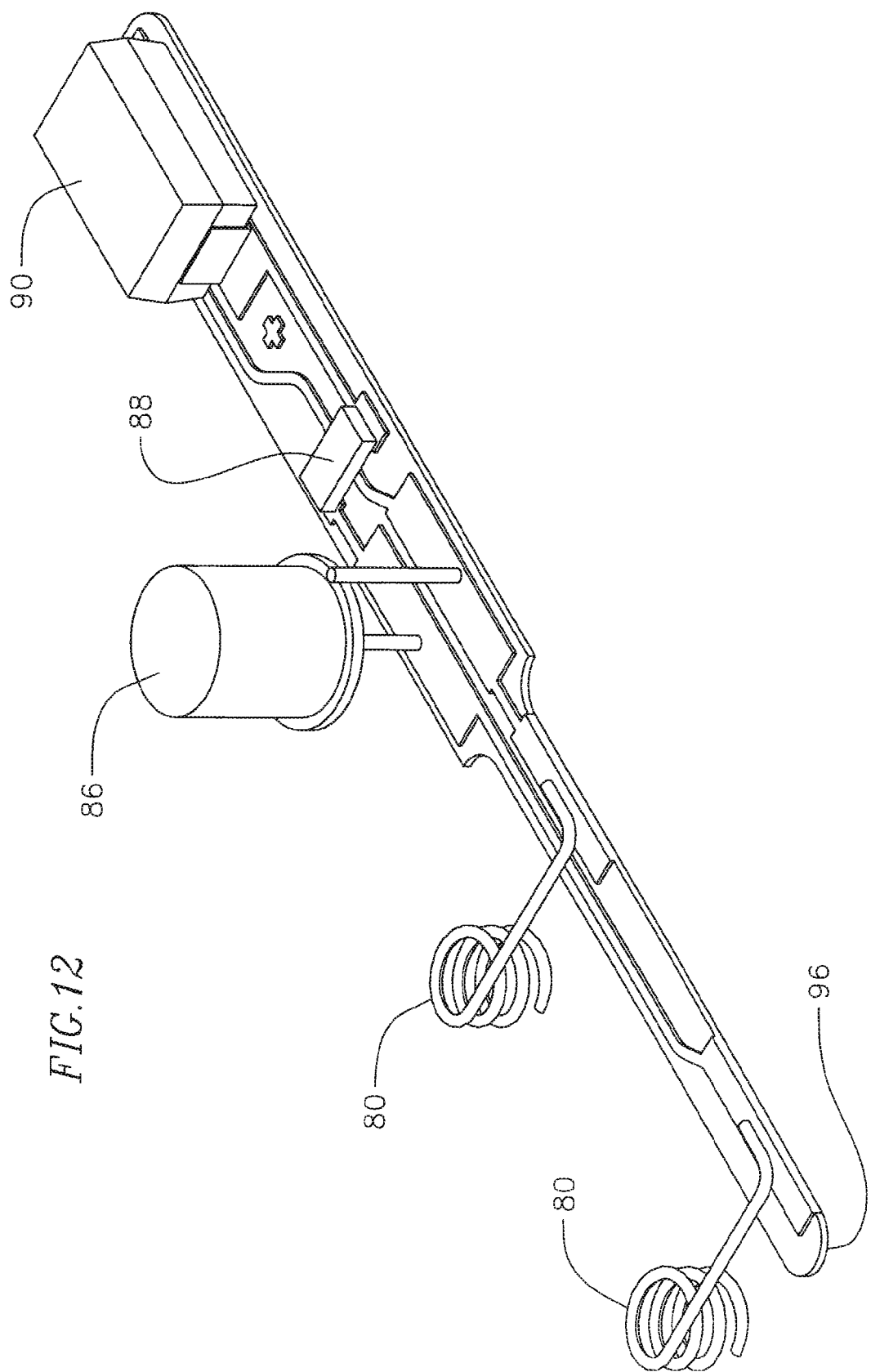

With reference now to FIGS. 12-14, one arrangement of the electrical components as housed in the switch assembly 62 is provided. As shown in the figure, each spring 80 contacts a flex cable 96 to relay power provided from the night vision goggles to a capacitor and a resistor. The tip-over switch 86, for example a mercury switch or a ball switch, is also connected to the flex cable 96 and is configured to alternate between an "on" position and an "off" position depending on its orientation with respect to the ground.

Figure 16:
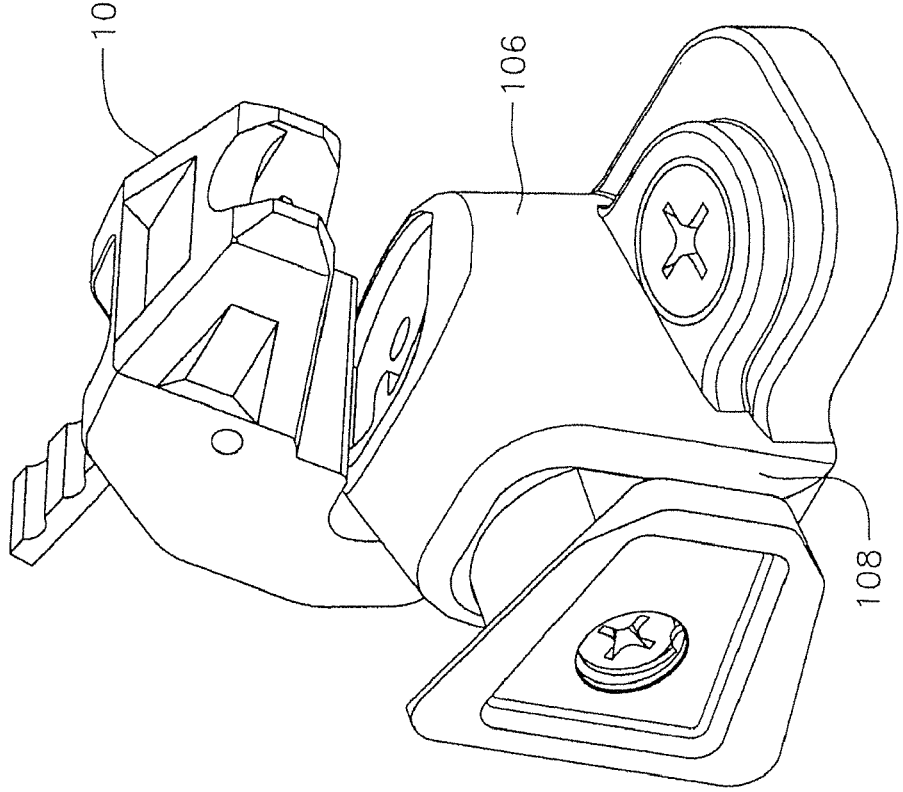
FIGS. 16 and 17 are an orthogonal view and a partially exploded view, respectively, of an embodiment of an adapter of the present invention having a goggle horn attachment.
Figure 17:
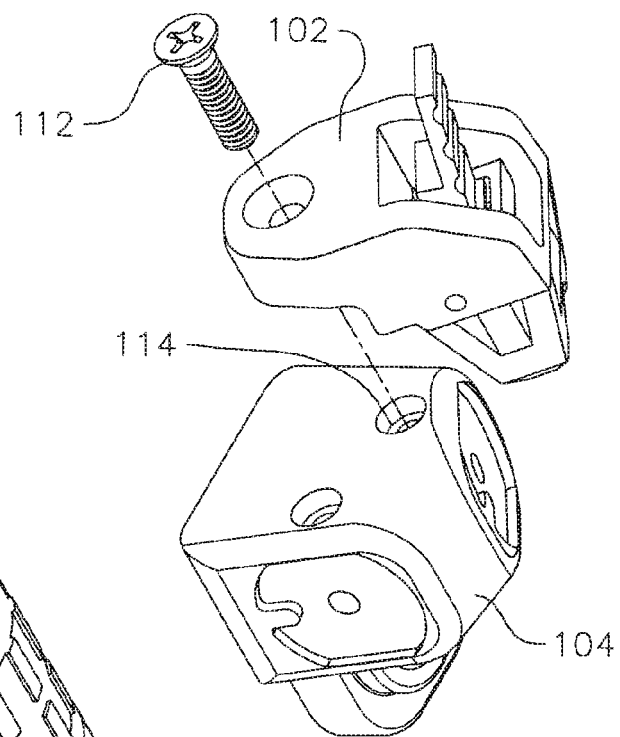
Figure 18:
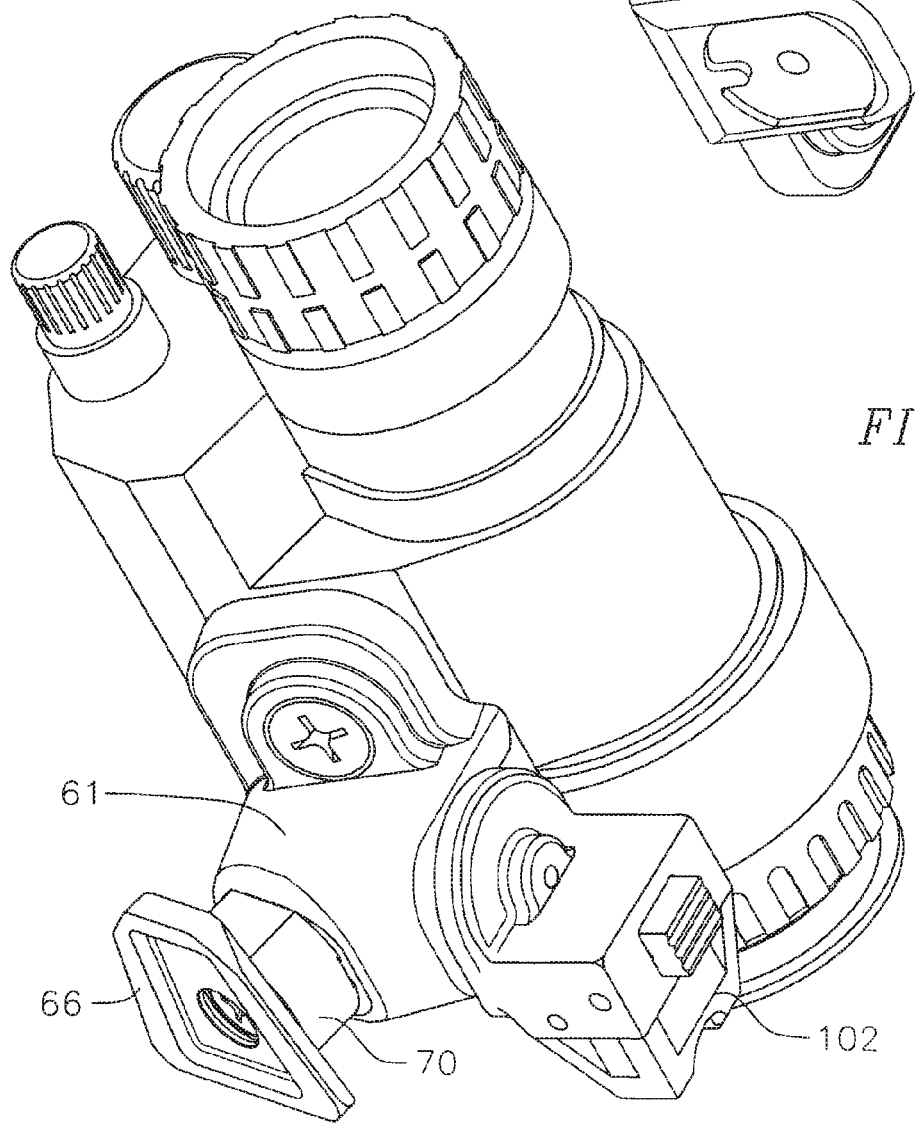
FIG. 18 is an orthogonal view of an alternate embodiment of an adapter having a goggle horn attachment, wherein the adapter is attached to night vision goggles.

Additionally, in yet another embodiment as shown in FIGS. 16 and 17, a goggle horn insert 102 may be attached to a body 104 on a surface adjacent a first arm 106 and a second arm 108 by a fastener 112 inserted into an opening 114. As such, the adapter can accommodate a night vision goggle mount that is configured for use with a google horn insert. As shown in FIG. 18, rather than being attached adjacent the first or second arm 106, 108, the goggle horn insert 102 could be attached directly to the first or second arm by a fastener similar to the configuration of the dovetail insert 66 attached to the adapter, as described above. As will be appreciated, other types of engagement inserts or configurations may be attached to the first arm 69 or to the second arm 71 as well.

Figure 19:
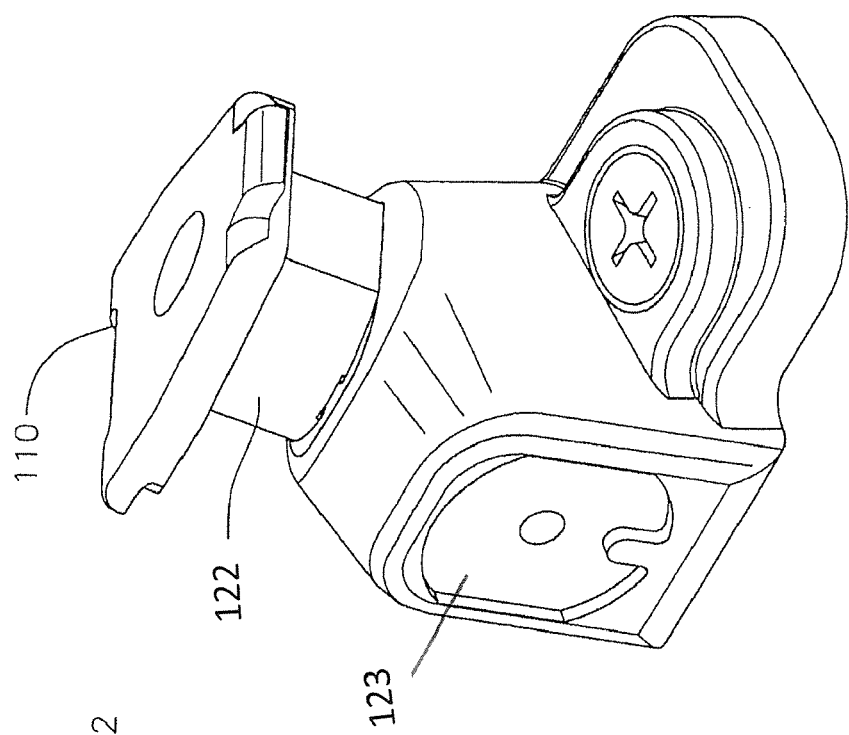
FIG. 19 is an orthogonal view of an embodiment of an adapter of the present invention having a hot shoe insert.

With respect to FIG. 19, a hot shoe insert 110 is attached to the first or second arm 106, 108. As shown in the figure, the hot shoe insert 110 has substantially a dovetail shape adapted to be received in, for example, a hot shoe tip-in assembly, and may include a stem 122 extending therefrom that is configured to fit into the recessed area 123.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, the written description and the drawings, and equivalents thereof.

What is claimed is:

1. An adapter for attaching night vision goggles to a goggle mount, the adapter comprising:
   a body having a first arm and a second arm;
   a base extending from the body and configured to attach the adapter to night vision goggles; and
   a first insert removably attached to the first arm or to the second arm for attaching the adapter to the goggle mount, wherein the first arm and the second arm are oriented such that when the night vision goggles are attached to the goggle mount by the adapter, the night vision goggles are substantially aligned with a user's left eye or right eye, respectively.

2. The adapter of claim 1, wherein the base and the body are integral with each other.

3. The adapter of claim 1, wherein the first insert is a dovetail insert, a goggle horn insert or a hot shoe.

4. The adapter of claim 1, where the first insert comprises an engaging member for engaging the goggle mount and a stem extending from the engaging member and adapted to be attached to the first arm or to the second arm.

5. The adapter of claim 4, wherein the first arm and the second arm each have a recessed surface adapted to receive the stem.

6. The adapter of claim 5, wherein the recessed surface has substantially parallel opposing sidewalls that generally correspond to a cross-sectional shape of the stem and prevent relative rotation between the first insert and the body.

7. The adapter of claim 5, wherein the stem comprises a notch and wherein the recessed surface comprises a rib adapted to engage the notch.

8. The adapter of claim 1, wherein the first insert is attached to the first arm or to the second arm by a fastener.

9. The adapter of claim 8, wherein the fastener is a screw, a bolt, or a rivet.

10. The adapter of claim 1, wherein the first insert is removably attached to the first arm and a second insert is removably attached to the second arm.

11. The adapter of claim 10, wherein the first insert and the second insert have different configurations.

12. The adapter of claim 1, wherein the base is adapted to be attached to the night vision goggles by a fastener.

13. The adapter of claim 12, wherein the fastener is a screw, a bolt, or a rivet.

14. The adapter of claim 1, wherein the body has a cavity housing a switch assembly for powering the night vision goggles attached to the adapter.

15. The adapter of claim 14, wherein the switch assembly is adapted to maintain an electrical connection with the attached night vision goggles when the adapter is in a use orientation and wherein the switch assembly is adapted to sever the electrical connection when the adapter is in a stowed orientation.

16. The adapter of claim 15, wherein the switch assembly is adapted to maintain the electrical connection for about 0.5 second in the stowed orientation before severing the electrical connection.

17. An adapter kit for attaching night vision goggles to a goggle mount, the adapter kit comprising:
   an adapter comprising a body having a first arm and a second arm; and a base extending from the body and configured to attach the adapter to night vision goggles, wherein the first arm and the second arm are oriented such that when the night vision goggles are attached to the goggle mount by the adapter, the night vision goggles are substantially aligned with a user's left eye or right eye, respectively;
   a plurality of inserts, each of the plurality of inserts removably attachable to the first arm or to the second arm to attach the adapter to the goggle mount; and
   at least one fastener for removably attaching one of the plurality of inserts to the first arm or the second arm.

18. The adapter kit of claim 17, wherein the plurality of inserts comprises at least one of a dovetail mount, a goggle horn mount or a hot shoe.

19. The adapter kit of claim 17, wherein the at least one fastener is a screw, a bolt or a rivet.

* * * * *